US005146886A

United States Patent [19]

Männle et al.

[11] Patent Number: 5,146,886

[45] Date of Patent: Sep. 15, 1992

[54] SYSTEM FOR CONTROLLING AN INTERNAL COMBUSTION ENGINE

[75] Inventors: Erik Männle, Oberkirch; Bernd Lieberoth-Leden, Leonberg; Wolfgang Maisch, Schwieberdingen, all of Fed. Rep. of Germany

[73] Assignee: Robert Bosch GmbH, Stuttgart, Fed. Rep. of Germany

[21] Appl. No.: 646,770

[22] PCT Filed: Jun. 13, 1990

[86] PCT No.: PCT/DE90/00445

§ 371 Date: Feb. 7, 1991

§ 102(e) Date: Feb. 7, 1991

[87] PCT Pub. No.: WO91/00957

PCT Pub. Date: Jan. 24, 1991

[30] Foreign Application Priority Data

Jul. 7, 1989 [DE] Fed. Rep. of Germany ....... 3922419

[51] Int. Cl.[5] ........ F02D 11/10

[52] U.S. Cl. ........ 123/325; 123/320; 123/399

[58] Field of Search ........ 123/325, 326, 399, 328, 123/327, 324, 320

[56] References Cited

U.S. PATENT DOCUMENTS

| | | | |
|---|---|---|---|
| 4,603,675 | 8/1986 | Junginger et al. | 123/478 |
| 4,622,936 | 11/1986 | Junginger et al. | 123/399 |
| 4,644,922 | 2/1987 | Glöckler et al. | 123/493 |
| 4,955,346 | 9/1990 | Kaneyasu et al. | 123/399 |

OTHER PUBLICATIONS

Article entitled "Elektronische Motorsteuerung für Kraftfahrzeuge" by Gerhard Kolberg, published in Motortechnische Zeitschrift, 46th year, vol. 4, (Apr. 1985).

*Primary Examiner*—Andrew M. Dolinar
*Attorney, Agent, or Firm*—Walter Ottesen

[57] ABSTRACT

A method for controlling an internal combustion engine is proposed, in particular in conjunction with control systems for engine power, in which, in order to avoid potentiometer failures due to deposits of insulating abraded material on the potentiometer track due to the movement of a positioning component, in particular a throttle flap, in overrun operation, with released accelerator pedal and above a pregiven resume engine speed where there is fuel cutoff, the positioning component is briefly moved out of its fixed position or is closed beyond its pregiven idle position. On reaching a certain position for upon renewed fuel supply due to the engine speed falling below the resume engine speed, the positioning component is abruptly reset to its fixed position.

26 Claims, 3 Drawing Sheets

SYSTEM FOR CONTROLLING AN INTERNAL COMBUSTION ENGINE

FIELD OF THE INVENTION

The invention relates to a system for controlling an internal combustion engine with the engine having at least one electronically controllable adjusting component such as for influencing the power of the engine.

BACKGROUND OF THE INVENTION

In many areas of automotive engineering, positions of movable positioning components such as actuating elements are potentiometrically sensed, in particular in connection with engine controls. The movable tap of the potentiometric measuring arrangement is connected to the shaft of the particular positioning component.

The movable potentiometer contact results in abraded material on the slider track of the potentiometer, which forms an insulating layer on the slider track. This may cause misinterpretation of the measuring signal or failure of the measuring arrangement and consequently of the electronic control connected to it. Availability of the system is thus considerably restricted.

Accordingly, the invention is based on the task of specifying measures which lead to an increase in the availability of the engine control system.

In electronic engine power controls, the principle of which is known for example from EP-A 171 641 or from the publication of G. Kolberg: "Elektronische Motorsteuerung füor Kraftfahrzeuge", Motortechnische Zeitschrift, 46th year, Volume 4, 1985, potentiometers are used for sensing the accelerator pedal position and for position feedback of the throttle flap position. In such systems, the throttle flap is controlled by electronic means directly and/or indirectly as a function of measured variables, among which the accelerator pedal position representing the driver's requirement is counted, by an electronic control unit via a positioning motor connected to the throttle flap and the position feedback potentiometer.

Further, it is known to use such systems in the idle case for controlling the idle speed via the throttle flap. For this purpose, the throttle flap maintains the idle opening angle when the accelerator pedal is released in order to supply the internal combustion engine with the pregiven idle air. To control the idle speed, the throttle flap is then adjusted between its minimum idle position and its maximum idle position.

The insulating abraded material generated by the potentiometer slider on the potentiometer track is pushed back and forth in the driving operation by the movement of the positioning component connected to the potentiometer and becomes deposited on the potentiometer track particularly at the turning points of the movement. There, an insulating layer forms between potentiometer track and slider, which results in the above-mentioned failure of the potentiometer and of the control system.

In the case of an electronic engine power control, the idle position is taken up most frequently, so that the failure frequency of the potentiometer due to dirt accumulation in its idle position is particularly great. For safety reasons, the electronic engine power control reacts to this error, which can be detected by means of a plausibility comparison with a further position signal, with a power restriction so that considerable impairments to the availability of the motor vehicle may occur. Safety monitoring functions which detect such error conditions and initiate the corresponding measures are known, for example, from U.S. Pat. No. 4,603,675.

SUMMARY OF THE INVENTION

According to the invention, the measure is therefore introduced that, in at least one pregiven operating condition of the internal combustion engine, in particular in overrun operation, the positioning component briefly leaves its position fixed by measured variables, such as the accelerator pedal position etc., and thus the abraded material is removed from the critical area. In this context, briefly means that the period of time for which the positioning component leaves its fixed position is small when compared to the average duration of the pregiven operating condition.

For systems in which the active range of movement of the positioning component is not limited by mechanical stops, such as the electronic engine power control system with integrated idle control mentioned at the beginning, the positioning component is moved, preferably in overrun operation of the internal combustion engine, out of its active range of movement, which the positioning component covers in normal operation, and thus the dirt accumulation is removed from the active potentiometer area.

An electronic control system of the internal combustion engine in overrun operation is known from U.S. Pat. No. 4,644,92. In dependence upon pregiven operating parameters, for example engine speed and engine temperature, the fuel metering is cut out when the accelerator pedal is released or the throttle flap is closed. The overrun cutout takes place whenever the engine speed is above a pregiven engine speed, the engine temperature is above, for example, 80° C. and accelerator pedal and/or throttle flap are in idle position.

DESCRIPTION OF THE PREFERRED EMBODIMENT OF THE INVENTION

Figure 1:
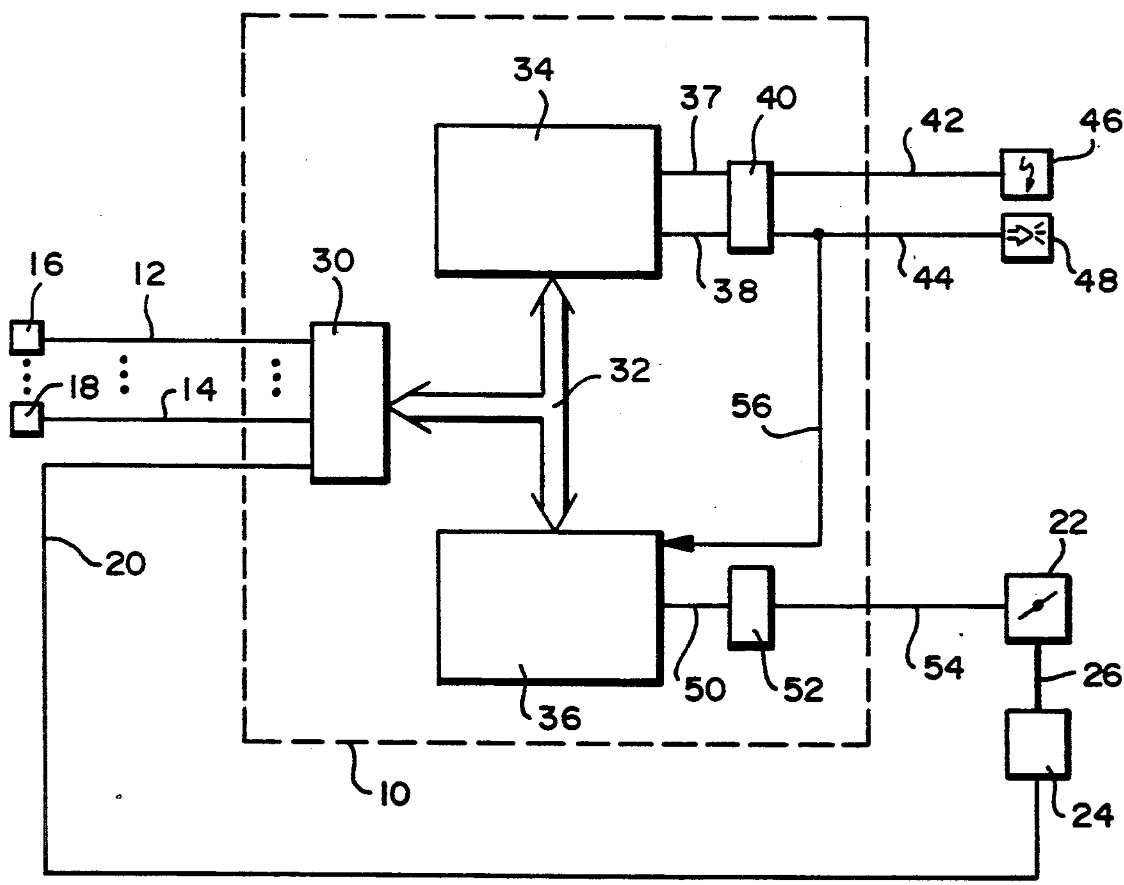
In FIG. 1, an overview block diagram of an engine control system having idle control is shown, while FIGS. *2a* to *2c* show time characteristics of accelerator pedal position, engine speed and throttle flap position, respectively, to explain the measures according to the invention. Finally, FIG. 3 describes the procedure according to the invention by means of a flowchart.

In the overview block diagram according to FIG. 1, an engine control system is drawn to which characteristic operating variables of the internal combustion engine and of the motor vehicle, such as engine temperature, engine speed, battery voltage, supplied quantity of air, position of a control element which can be operated by the driver etc., are supplied via the input lines 12 to 14 from corresponding measuring devices 16 to 18. Furthermore, the engine control system 10 is supplied, via the line 20, with the position of the power positioning component 22 of the internal combustion engine, which is preferably a throttle flap influencing the supply of air to the internal combustion engine. In this arrangement, the line 20 connects the engine control system 10 to a measuring unit 24 for the position of the power positioning component. The measuring unit 24 is coupled via a connection 26 to the power positioning component 22.

In one embodiment, the measuring unit 24 is a potentiometer, the movable tap of which is connected to the connection 26, and thus is rigidly connected to the power positioning component 22.

The engine control system 10 comprises an input area 30 into which the input lines 12 to 14 and 20 lead. There, the editing of the input signals, in particular an analog-digital conversion, is performed. The input area 30 is connected via an internal line system 32 to a computer or control unit 34 and to a further computer or control unit 36. The computer unit 34 controls ignition and injection in dependence upon the characteristic operating variables of the internal combustion engine and of the vehicle which are supplied to the unit 34 via the line system 32. The drive values determined in the computer unit 34 for, ignition and injection are supplied via the output lines 37 and 38, the output stage circuit 40 and the output lines 42 and 44 of the engine control system 10 to the corresponding actuators 46 for the ignition of the internal combustion engine actuator and 48 for the quantity of fuel to be metered.

The computer unit 36 calculates a drive signal in dependence upon the operating parameters which are supplied to it via the line system 32. The drive signal value is transmitted via the output line 50, the output area 52, which comprises in particular an output stage circuit and/or a digital/analog converter, as well as the line 54 to the electrically operable power positioning component 22. Furthermore, the computer unit 36 can be supplied with the drive signal for the actuator 48 of the fuel metering via a line 56.

Figure 2A:
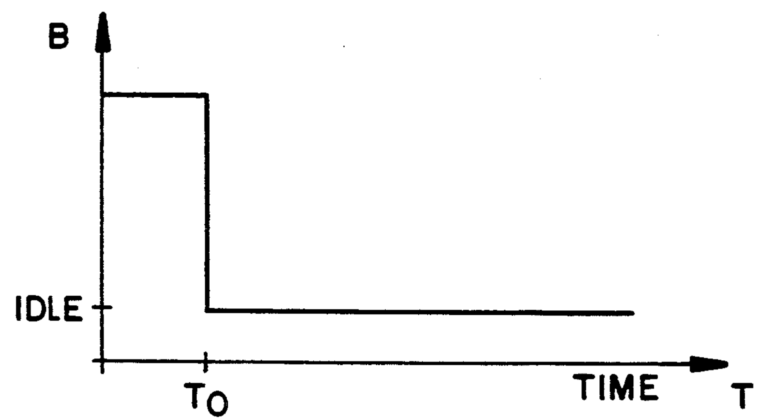
Figure 2B:
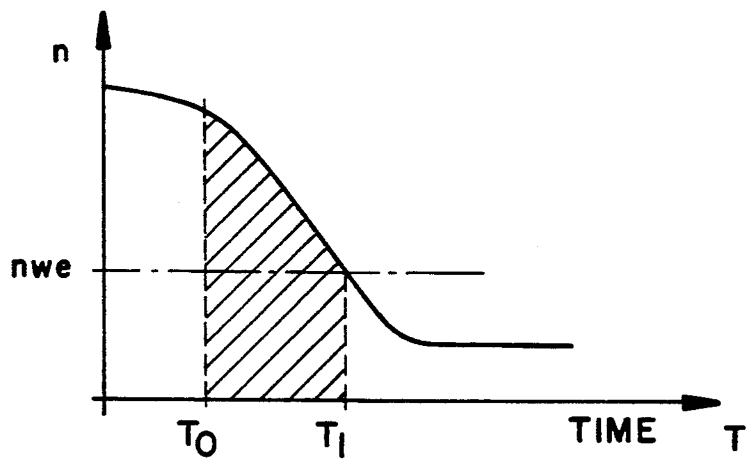
Figure 2C:
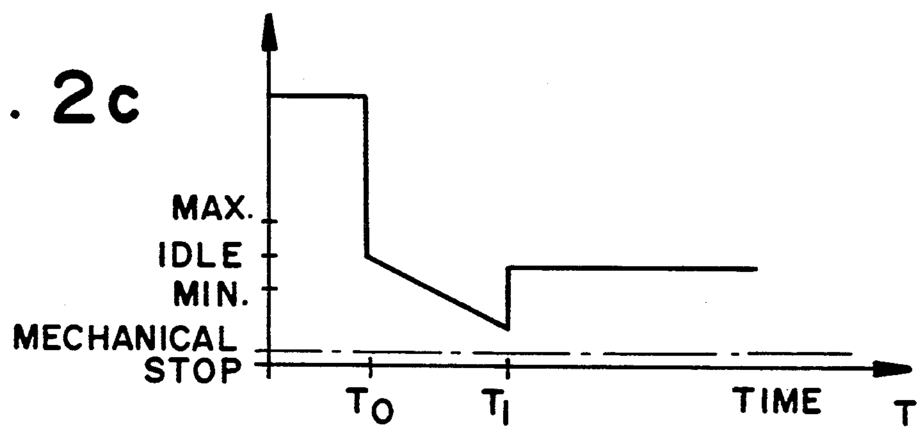

The procedure according to the invention, which is carried out in the drawn arrangement according to FIG. 1, is explained in further detail below by the example of the time characteristic curves shown in FIGS. 2a to 2c.

At the time $T_0$, the driver takes his foot off the accelerator pedal, that is, at the time $T_0$ the accelerator pedal assumes its idle position, and the throttle flap is moved in the direction of closing. The throttle flap position reaches its idle position at the time $T_0$, or slightly after the accelerator pedal has reached its rest position. Minimum idle position and full-load position of the throttle flap define here the active operating range of the throttle flap potentiometer. If the engine speed is above a certain value in the idle position of the accelerator pedal or the throttle flap, and if the engine temperature is greater than a pregiven threshold (for example 80° C.), the fuel-supply system of the internal combustion engine reacts by overrun cutout. With decreasing engine speed, the fuel-metering system begins once again to meter fuel at a predetermined resume engine speed ($n_{We}$), which generally depends on engine temperature and other parameters. FIG. 2b shows the time-dependent engine speed characteristic, in which this point is at the time point $T_1$. The range of fuel cutout is represented in this diagram by shading. If the speed drops below the resume engine speed, the fuel-metering system begins once again to meter fuel.

As long as the internal combustion engine is in the overrun cutout phase as described above, then in the method according to the invention, the throttle flap is moved during closing beyond the idle point to a position which is not used in the normal driving operation. This operation is shown in FIG. 2c. After reaching this position, which may lie directly in front of the mechanical stop, or after the speed drops below the resume engine speed, the throttle flap is immediately returned to the required idle position. In FIG. 2c, this is illustrated by an abrupt change in the throttle flap position at the time $T_1$. Due to overshooting of the idle position of the throttle flap which took place between the time points $T_0$ and $T_1$ in FIG. 2c, the dirt which tends especially to collect at the idle position of the throttle flap, and can lead there to an insulating layer between slider and potentiometer track, is pushed into a non-critical area.

The illustrated throttle flap position characteristic is preferably provided by a computer.

Figure 3:
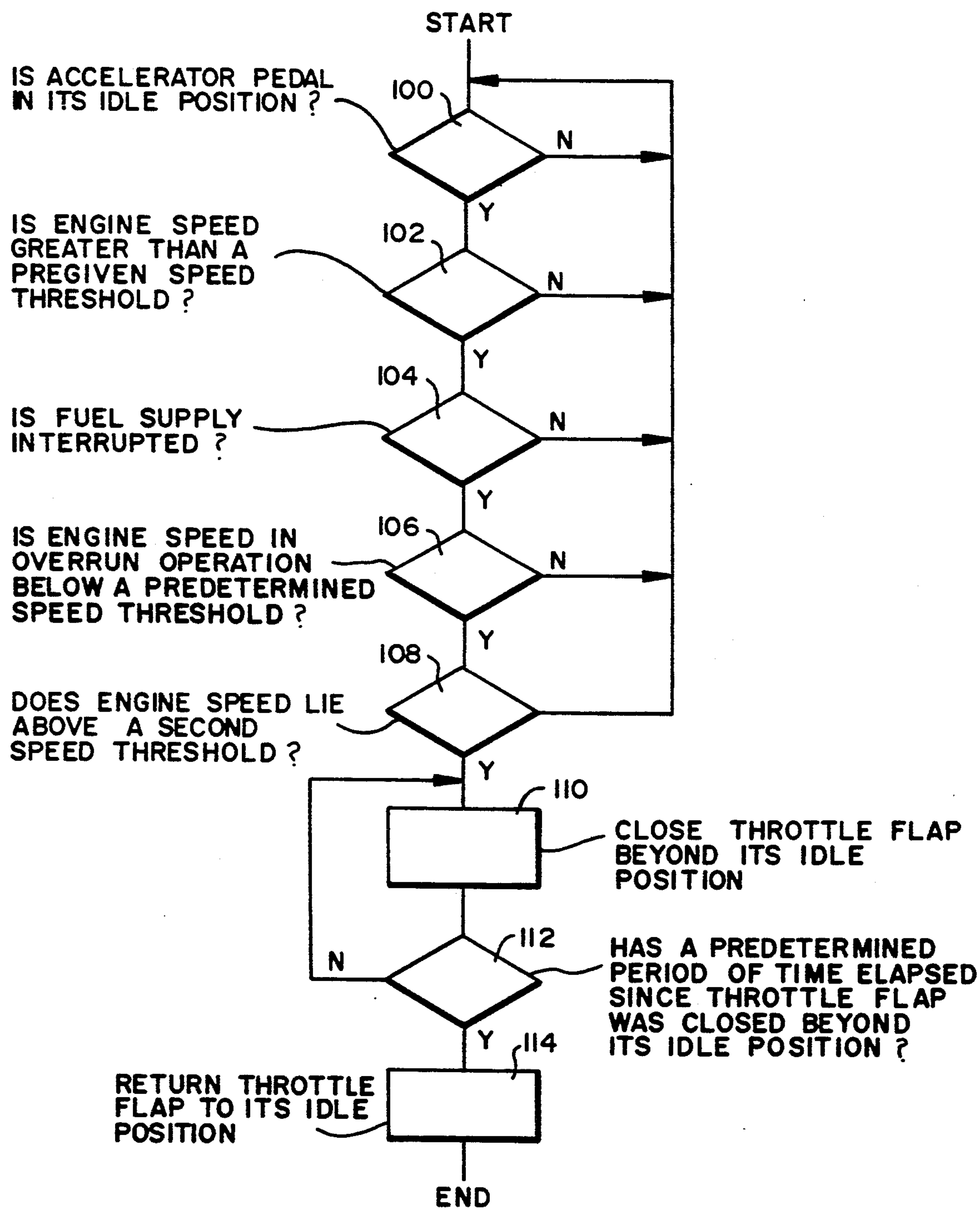

An example of such a computer program is drawn in the flowchart according to FIG. 3. After the start of the program section, the position signal of the accelerator pedal is in the first interrogation step 100 evaluated as to whether the accelerator pedal is in its idle position. This interrogation can take place both by comparison of the position signal of the accelerator pedal with a pregiven idle value and by evaluation of a change in state of a switch coupled to the idle position of the accelerator pedal. If the accelerator pedal is in its idle position, it is checked in interrogation step 102 whether, with the accelerator pedal in its idle position, the speed of the internal combustion engine is above a pregiven speed threshold, the resume engine speed. The interrogation steps 100 and 102 thus establish the operating condition of overrun operation of the internal combustion engine or of the motor vehicle. If, as mentioned above, along with the accelerator pedal position condition and the engine speed condition, other conditions are provided for the definition of overrun operation, these are likewise interrogated in step 102. In the event of a negative response in one of the steps 100 or 102, the program section is run through again, beginning with step 100.

In the overrun operation, as is known, a cutout of the fuel is performed above the resume engine speed threshold. To be able to perform the measure of cleaning the potentiometer track of the potentiometer connected to the power positioning component by a closing of the power positioning component beyond its idle point, without influencing the quality of the exhaust gas, it must be ensured that the fuel supply to the internal combustion engine is switched off. This is most effectively carried out by an interrogation step 104, with the aid of which, by evaluating the injection signal itself, that is the drive signal of the injection valves, there is interrogation as to whether the fuel supply is actually interrupted or not. This interrogation is necessary since, once overrun operation has commenced, the actual cutout of the fuel supply does not take place completely until after a certain delay. The direction evaluation of the injection signal permits an exact detection of the interruption in fuel. Alternatively, instead of the interrogation step 104, a time filter would have to be provided, the delay period of which is dimensioned such that a complete cutout of the fuel feed is ensured.

If the interruption in fuel supply is established conclusively in the interrogation step 104, or if the above-mentioned delay period has elapsed, the procedure continues with the interrogation steps 106 and 108.

In overrun operation of the internal combustion engine or of the motor vehicle, a closing of the throttle flap beyond its idle position results in an increased negative pressure in the intake pipe of the internal combustion engine in contrast to a throttle flap located in idle position. This increased negative pressure may cause a deterioration in the exhaust gas of the internal combustion engine when the throttle flap is closed beyond its idle position. Due to the increase in the negative pressure, the effective intake of the combustion engine is increased, and, as a result, for example, more oil is taken in from the crankcase via the piston rings than would be the case with the throttle flap located in idle position. Therefore, according to step 106, an interrogation may be provided as to whether the speed of the internal combustion engine in overrun operation is below a predetermined speed threshold. This interrogation excludes the range of high engine speeds, that is, the range of an excessive negative pressure in the intake pipe, in order to avoid the disadvantages outlined above. If the speed of the internal combustion engine lies above the pregiven speed value, the program section beginning with step 100 is run through again. If the engine speed lies below the threshold value, the procedure continues with the interrogation step 108.

In order to avoid carrying out the procedure according to the invention in a speed range in the proximity of the resume engine speed threshold, and the associated disadvantages with regard to the composition of the exhaust gas which would occur in the possible event of fuel supply recommencing with the throttle flap in a position beyond its idle position, a second speed threshold is pregiven which lies above the resume engine speed threshold and adapts itself to the latter, and the speed of the internal combustion engine is checked in relation to this second threshold in the step 108. If the engine speed lies above this second threshold, the program continues, otherwise the program is restarted.

The interrogation steps 106 and 108 represent an advantageous addition to the procedure according to the invention; it is likewise possible to design the flowchart according to FIG. 3 without the interrogation blocks 106 and 108.

The continuation of the program section takes place in the step 110 with implementation of the actual closing operation, that is the closing of the throttle flap beyond the position which corresponds to its idle position. In the step 110, the throttle flap is therefore moved, according to a predetermined function, beyond its idle position in the direction of its mechanical stop. During this movement, the movable tap of the potentiometer remains in contact with the potentiometer track.

In one embodiment, it has proved suitable to close the throttle flap beyond its idle position up to just before reaching its mechanical stop by subtraction of a fixed, predetermined value from its idle value pregiven in the computer unit 34. This closing operation is performed here in a controlled manner and remains without effect on the position control of the throttle flap executed by the computer unit 36, since the control unit is frozen for the duration of the wiping or closing operation at its idle value which was set before beginning the wiping operation. This avoids the computer unit working against the closing operation due to the system deviation between desired and actual value arising due to the closing of the throttle flap.

In order to avoid adverse effects from the closing operation on the operating performance of the internal combustion engine or the motor vehicle, it is additionally provided to close the throttle flap only briefly and then to return it again to its idle value, which is pregiven by the control unit. Therefore, with step 112 a time interrogation is inserted, which checks whether a predetermined period of time has elapsed since the throttle flap was closed beyond its idle position. This period of time is selected such that on the one hand, the idle position of the throttle flap is left for a sufficient amount for the insulating abraded material to be displaced and that, on the other hand, no adverse effects are to be expected due to this measure, for example with regard to the composition of the exhaust gas or the operating performance of the internal combustion engine. A period of time in the range of milliseconds to seconds has proved suitable.

If this pregiven time has elapsed, the throttle flap is returned in step 114 abruptly to its idle position and the program section is restarted.

Instead of the procedure according to steps 110 and 112, there is also the possibility of moving the throttle flap beyond its idle position in the direction of its mechanical stop by following for example a linear time function. This measure can take place for example by a corresponding intervention in the desired value presetting of the position control loop of the throttle flap. In this exemplary embodiment, the closing operation is performed in a controlled manner. On reaching a pregiven end value, the throttle flap is in this case reset abruptly to its idle value.

The method according to the invention can be applied in the overrun mode of operation as well as in the pre-starting phase or after switching off the internal combustion engine.

It is understood that the corresponding measures can also be applied in the range of the full-load position of the throttle flap.

The measures according to the invention can be applied not only to systems which have an electrically controlled throttle flap but also to other mechanical systems with actuating drives, provided a potentiometer for position determination is connected to the actuating drive. This is the case in particular with an electrically controlled control rod of a diesel engine.

The exemplary embodiment described above comprises an electronic control system for the engine power of an internal combustion engine, which controls the engine power in all operating ranges by means of the position of a throttle flap. In order to ensure the supply of air in the idle mode as well, this positioning component therefore has an active range of movement which is smaller in absolute terms than the maximum range of movement between the two mechanical end stops. Therefore, a brief closing of the throttle flap beyond its idle position is possible.

In the case of systems in which the positioning component has an active range of movement which is the same as the maximum range of movement between the two mechanical end stops, and the positioning component is connected to a position sensor having the problems indicated at the beginning, a departure from the active range of movement cannot be carried out.

Therefore, the measures according to the invention are carried out there in the manner that, in at least one pregiven operating mode, the positioning component is briefly moved out of the position pregiven in this operating mode and in this way the harmful abraded material, which leads to a malfunctioning of the position sensor, is moved out of the critical area into a less critical area.

If the measures are carried out in overrun mode of the internal combustion engine, then the positioning component is generally at its idle stop in this operating mode. The cleaning of the potentiometer track is performed by a brief movement of the positioning component out of this stop position into an opened position.

The other measures described above are applied in the same manner.

We claim:

1. A system for controlling an internal combustion engine of a motor vehicle, the engine having at least one electronically controllable adjusting component such as for influencing the power of the engine, the system comprising:

a measuring unit fixedly connected to said adjusting component for detecting the position of said adjusting component;

control means for fixing the position of said adjusting component with a pregiven normal operating range in dependence upon measured variables of a least one of the engine and motor vehicle; and, actuating means for moving said adjusting component out of said operating range for a short time duration in at least one operating mode of the engine wherein an acceleration of the vehicle does not take place as a consequence of fuel metered to the engine.

2. The system of claim 1, said adjusting component being a throttle flap and said measuring unit being a potentiometer; and, said actuating means being adapted to move said throttle flap out of said operating range in operating modes wherein fuel to the engine is cut off.

3. The system of claim 2, wherein said adjusting component has a predetermined path of movement pregiven for normal operation of the engine; said path of movement having minimum and maximum stops; and, said actuating means being adapted to cause said adjusting component to leave said operating range in the direction of one of said stops.

4. The system of claim 1, wherein the movement out from said operating range is performed in a controlled manner by changing the position of said adjusting component by a pregiven amount.

5. The system of claim 1, wherein: after a pregiven period of time has elapsed, said adjusting component returns in an abrupt manner into said operating range.

6. The system of claim 1, wherein: the moving out from said operating range is performed under closed-loop control or open-loop control, with the adjusting component being moved in the direction of one of said stops by following a pregiven function.

7. The system of claim 2, wherein: on reaching a pregiven position of the adjusting component, sensed by said potentiometer, an abrupt return of said adjusting component into said operating range takes place.

8. The system of claim 1, wherein: upon resumed fuel feed, an abrupt resetting of said adjusting component into said operating range takes place.

9. The system of claim 1, wherein: the pregiven operating mode is the overrun mode of operation of the engine or the pre-starting phase.

10. The system of claim 1, wherein: said adjusting component has a predetermined operating range and leaves said operating range in an engine speed range pregiven by an upper threshold and a lower threshold.

11. The system of claim 1, wherein: said adjusting component has a predetermined operating range and leaves said operating range at the maximum position thereof.

12. The system of claim 3, wherein: said adjusting component is moved briefly out of said operating range in the direction of one of said stops.

13. A system for controlling an internal combustion engine of a motor vehicle, the engine having at least one electronically controllable adjusting component such as for influencing the power of the engine, the system comprising:

a measuring unit fixedly connected to said adjusting component for detecting the position of said adjusting component;

control means for causing said adjusting component to pass over a pregiven range during normal operation of the engine; and, said control means being adapted to cause said adjusting component to leave said position and said range in at least one pregiven operating condition of the engine wherein an acceleration of the vehicle does not take place as a consequence of fuel metered to the engine.

14. The system of claim 13, wherein said pregiven range is limited by the minimum idle position and maximum full-load position of said adjusting component, which can be set by a computer unit in normal operation of the engine.

15. The system of claim 14, wherein: said adjustment component leaves said operating range beyond said idle position.

16. The system of claim 13, said adjusting component being a throttle flap and said measuring unit being a potentiometer; and, said control means being further adapted to move said throttle flap out of said range in operating conditions wherein fuel to the engine is cut off.

17. The system of claim 16, wherein said adjusting component has a predetermined path of movement pregiven; said path of movement having minimum and maximum stops; and, said control means being further adapted to cause said adjusting component to leave said range in the direction of one of said stops.

18. The system of claim 13, wherein the movement leaving said range is performed in a controlled manner by changing the position of said adjusting component by a pregiven amount.

19. The system of claim 13, wherein: after a pregiven period of time has elapsed, said adjusting component returns in an abrupt manner into said range.

20. The system of claim 13, wherein: the leaving of said range is performed under closed-loop control or open-loop control, with the adjusting component being moved in the direction of one of said stops by following a pregiven function.

21. The system of claim 16, wherein: on reaching a pregiven position of the adjusting component, sensed by said potentiometer, an abrupt return of said adjusting component into said range takes place.

22. The system of claim 13, wherein: upon resumed fuel feed, an abrupt resetting of said adjusting component into said range takes place.

23. The system of claim 13, wherein: the pregiven operating mode is the overrun mode of operation of the engine or the pre-starting phase.

24. The system of claim 13, wherein: said adjusting component leaves said range in an engine speed range pregiven by an upper threshold and a lower threshold.

25. The system of claim 13, wherein: said adjusting component leaves said range at the maximum position thereof.

26. The system of claim 13, wherein: said adjusting component is moved briefly out of said range in the direction of one of said stops.

* * * * *

UNITED STATES PATENT AND TRADEMARK OFFICE

CERTIFICATE OF CORRECTION

PATENT NO. : 5,146,886

DATED : September 15, 1992

INVENTOR(S) : Erik Männle, Bernd Lieberoth-Leden and Wolfgang Maisch

It is certified that error appears in the above-identified patent and that said Letters Patent is hereby corrected as shown below:

In the title page, in the Abstract, line 12: delete "for".

In column 1, line 29: delete "EP-A 171 641" and substitute -- United States Patent 4,622,936 -- therefor.

In column 1, line 31: delete "füor" and substitute -- für -- therefor.

In column 2, line 31: delete "Pat. No. 4,644,92" and substitute -- Pat. No. 5,644,922 -- therefor.

In column 3, line 16: between "for" and "ignition", delete -- , --.

In column 3, line 20: delete "actuator and" and substitute -- and actuator -- therefor.

UNITED STATES PATENT AND TRADEMARK OFFICE

CERTIFICATE OF CORRECTION

PATENT NO. : 5,146,886

DATED : September 15, 1992

INVENTOR(S) : Erik Männle, Bernd Lieberoth-Leden and Wolfgang Maisch

It is certified that error appears in the above-identified patent and that said Letters Patent is hereby corrected as shown below:

In column 4, line 51: delete "direction" and substitute -- direct -- therefor.

In column 7, line 14: delete "a" and substitute -- at -- therefor.

Signed and Sealed this

Nineteenth Day of October, 1993

Attest:

BRUCE LEHMAN

*Attesting Officer* *Commissioner of Patents and Trademarks*